United States Patent
Rand et al.

(10) Patent No.: US 12,505,407 B2
(45) Date of Patent: Dec. 23, 2025

(54) SIMULATIONS BASED ON CAPTURING AND ORGANIZING VISUALS AND DYNAMICS OF SOFTWARE PRODUCTS

(71) Applicant: 3Sharp LLC, Redmond, WA (US)

(72) Inventors: Michael Ryan Rand, Kirkland, WA (US); Jeremy Wayne Campbell, Bellevue, WA (US)

(73) Assignee: 3SHARP, LLC, Redmond, WA (US)

( * ) Notice: Subject to any disclaimer, the term of this patent is extended or adjusted under 35 U.S.C. 154(b) by 0 days.

(21) Appl. No.: 17/173,491

(22) Filed: Feb. 11, 2021

(65) Prior Publication Data

US 2021/0248558 A1    Aug. 12, 2021

Related U.S. Application Data

(60) Provisional application No. 62/975,121, filed on Feb. 11, 2020.

(51) Int. Cl.
| | |
|---|---|
| *G09B 9/00* | (2006.01) |
| *G06Q 10/067* | (2023.01) |
| *G06Q 10/101* | (2023.01) |
| *G09B 19/00* | (2006.01) |

(52) U.S. Cl.
CPC ......... *G06Q 10/101* (2013.01); *G06Q 10/067* (2013.01); *G09B 9/00* (2013.01); *G09B 19/0053* (2013.01)

(58) Field of Classification Search
CPC ............... G09B 5/00; G09B 7/00; G09B 9/00
See application file for complete search history.

(56) References Cited

U.S. PATENT DOCUMENTS

| | | | | |
|---|---|---|---|---|
| 6,938,210 | B1* | 8/2005 | Huh .................... | G09B 5/06 |
| | | | | 715/730 |
| 2005/0026131 | A1* | 2/2005 | Elzinga .................... | G09B 5/00 |
| | | | | 434/365 |
| 2006/0053372 | A1* | 3/2006 | Adkins .................... | G09B 7/02 |
| | | | | 715/709 |
| 2012/0115122 | A1* | 5/2012 | Bruce .................... | G06F 9/453 |
| | | | | 434/323 |
| 2015/0064677 | A1* | 3/2015 | Baphna .................... | G09B 7/00 |
| | | | | 434/335 |
| 2015/0254998 | A1* | 9/2015 | Daetwyler ............ | G06F 3/1462 |
| | | | | 434/262 |
| 2018/0015345 | A1* | 1/2018 | Wrigg ................ | A63B 24/0062 |
| 2018/0197428 | A1* | 7/2018 | Baphna .................... | G09B 7/00 |

\* cited by examiner

*Primary Examiner* — Robert J Utama
(74) *Attorney, Agent, or Firm* — Richard T. Black; FisherBroyles, LLP (57) ABSTRACT

A system and/or method enable capturing snapshots of visuals and dynamic behaviors of software products, state of computer input devices or other peripherals and rendering them as an experience that looks and feels like the actual software product by replaying the snapshots when the same or similar input information is received.

31 Claims, 6 Drawing Sheets

SIMULATIONS BASED ON CAPTURING AND ORGANIZING VISUALS AND DYNAMICS OF SOFTWARE PRODUCTS

PRIORITY CLAIM

This application claims priority to U.S. Prov. Appl. No. 62/975,121 filed Feb. 11, 2020, the contents of which are hereby incorporated by reference as if fully set forth herein.

BACKGROUND OF THE INVENTION

There is a need in the software-product industry to have the capability to demonstrate products and product capabilities to clients and consumers for both sales and training purposes.

There are several approaches currently in use. One is to use the real software product to perform a demonstration or training session. Another approach is to capture a video recording of the software being used, which might include narration. Another approach is to manually capture screen shots or pictures of the software, and use presentation or design software, such as Microsoft® PowerPoint or Adobe® XD, to create a series of images that can be advanced through. One other approach is to build custom software to emulate all or part of the product using a combination of images and code.

The approach of using the real product can be too expensive to operate for demonstration or learning purposes. For example, complicated cloud software can cost thousands of dollars to run in order to provide a single demonstration or learning scenario. They can also take too much time, or require deep knowledge of the product to set up or configure. In other cases, the product or features may be new and subject to issues or instability during operation that causes the demonstration or learning experience to fail. The approach of creating a custom software application to emulate the experience of using the software solves the latter two issues of using the real product but can also be expensive and time-consuming to create or update when the product changes. Capturing recorded video, or manually capturing screen shots of the product and assembling them in general presentation or design software can be a faster and cheaper alternative to building custom software, but tends to lack the fidelity or possibility for complex interaction that custom software or the real product would have.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. As used herein, the terms "the invention" and "the present invention" are meant to refer to one or more embodiments in which the inventive concepts described herein may be presented are not to be interpreted as limiting in any manner.

Embodiments of the invention may be described in the general context of computer-executable instructions, such as program modules, being executed by a processing device having specialized functionality and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by a computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices and can be used to implement or otherwise perform practical applications.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

An embodiment creates a "simulation" of third-party software/applications, which is another application (usually web-based) that mimics the look and interactions of the original application. To create the simulation, information is gathered from the operating system, such as screen images, keyboard/mouse input, etc.

An embodiment of the invention makes it much more cost-effective to create, run and host software product simulations and run interactive product demonstrations or training materials. An insight into the software industry and business reality that is implemented in an embodiment of the invention is that, for certain key and broad use cases, absolute fidelity to the original software product is often detrimental to a successful outcome. One example of this is in learning, where absolute fidelity often leaves the student without guidance regarding what to do next. An embodiment makes it possible to create a realistic software product simulation that has the appropriate level of fidelity for various use cases. For purposes of the discussion herein, the term "realism" may refer to the user of the output's sense of being in the real product versus a simulation. Dynamic animations and other visual and audio cues are convincing enough that the user of the output "accepts" the simulation as real for the purposes of the current interaction (for example, learning). "Fidelity" may refer to functionality comparisons between the real software and the simulation-absolute fidelity can mean that every click and capability in the software would be represented in the simulation.) In the learning example, an embodiment can create a simulation in which the student is guided toward the right outcomes by the available click interactions within the simulation; in other words the level of "fidelity" in this case is such that not every item that is clickable in the real software is clickable in the simulation, and this is an advantage for the user of the output. Users of an embodiment (e.g., simulation creators) can create software-product simulations that are very realistic, while at the same time controlled and guided, to achieve the right outcome for software demonstrations in sales scenarios and/or for learning scenarios where users of the product need to try out a software capability in a safe environment.

One or more embodiments of the present invention hook into the operating system to monitor for device input, such as a mouse click or keyboard-key press, and capture the state of output devices, such as the images displayed on the screen, sounds played, or data for other feedback devices. It then assimilates this information and captures a snapshot of it. In a user interface according to an embodiment, the interaction snapshots (interactions) are displayed to the user in the sequence in which they happened as a series of steps that were taken in the software. In a user interface according to an embodiment, the user can further manipulate this data, such as to add or remove interactions, modify the associated data, or control settings for how the data is presented during a simulation. The captured interactions can be saved to a file format specific to an embodiment to be shared with others, moved to a different device, or worked on later.

Once the user is ready, they can use the user interface according to an embodiment to export the captured interactions to various formats. For example, they can export to a PowerPoint® file providing the same end-experience as if they had manually taken screen captures and built a presentation, but the effort is much lower than if they had used that approach, since an embodiment automatically captured their interactions as they used the software application and stored them in the correct order. One key ability is to export the interactions to a standalone web application, consisting of HTML, JavaScript, image files, and other supporting files. This output maintains high fidelity with the real software application in a similar way that custom built software would, but does not require knowledge from the user on how to code or build a web application. Since the files exported are standalone, they do not need a web server to run, thereby making the cost of hosting them online significantly less than running a full web application might be, while also allowing them to be easily run on the user's local machine when not connected to the internet. The time and cost reduction of this method make it advantageous over previous methods.

One or more embodiments of the present invention provide a method and system for capturing user interactions with one or more software applications running on an operating system and recording them in the order that the interactions happen. In an embodiment, the concept of an interaction is defined as mouse-, touch-, keyboard- or other device-input into a software application running on the operating system, including a website running in a web browser. The data recorded for each interaction can include the position of the mouse or touch point on the screen, which touch points or mouse buttons were active, any keys pressed on the keyboard, any audio played to the user, the screen image or images being displayed to the user when the interaction happened, or the output of any other system that provides feedback to the user. When capturing the screen display this can include only a single image, or a series of images showing how the screen changed over time.

In an embodiment, the grouping of recorded interactions, which may be referred to herein as the project, can be further organized into groups of interaction steps called sections.

The invention stores each interaction as a discrete item in a section, along with the associated data that was captured, and displays them to the user in an ordered sequence. Once the user has stopped capturing, they can further modify the interactions. These modifications can include changing the order in which the interactions occur, capturing and inserting new interactions, or modifying the data associated with the interaction, such as input information, and feedback information played for the user on device input. As part of adding additional interaction points, the user can define non-linear paths through the simulation, allowing for richer interaction than a completely linear simulation.

This approach according to one or more embodiments of the present invention is different from capturing screen shots and assembling them in presentation software. Since the capture in an embodiment is automated, the time needed to assemble the images in the correct order is greatly reduced. One or more embodiments of the present invention can also capture screen changes over time, similar to capturing a video screen recording, which is difficult to mimic using screen shots. However, it is different from current methods of screen recording, which capture video and mouse position over time but might not record input events such as mouse clicks or key presses. It is also different from video, in that each interaction is captured as a discrete item with only the data needed. For instance, a screen recording can last for long periods of time and capture many interactions, capturing the screen image at a specified interval over the course of the recording. However, in an embodiment, the screen can be captured for short periods after each interaction, and only save the images of when the screen is changing. Once the display of the application has become static, no more images may be needed to produce the simulation of that interaction. If the application doesn't produce any animated effects after an interaction, then only one image may need to be captured. Due to the reduction in number of images captured, an embodiment can store the images at full quality without resorting to lossy compression methods to reduce file size.

An embodiment includes methods for saving this project and the contained data to a storage device as a custom file format that can then be opened again in an embodiment to continue work or be shared with other users. The invention also allows the interactions to be exported to various formats, which may include standalone web applications, computer executables, or file formats for other products that support the basic functionality of displaying images, animations, or videos and changing the display based on mouse, touch, or keyboard input.

One or more embodiments of the present invention enable capturing snapshots of visuals and dynamic behaviors of software products, state of computer input devices or other peripherals and rendering them as an experience that looks and feels like the actual software product by replaying the snapshots when the same or similar input information is received. The production and operation of the software simulation environments is faster and cheaper than the market-leading approaches to sales enablement and end-user training.

Figure 1:
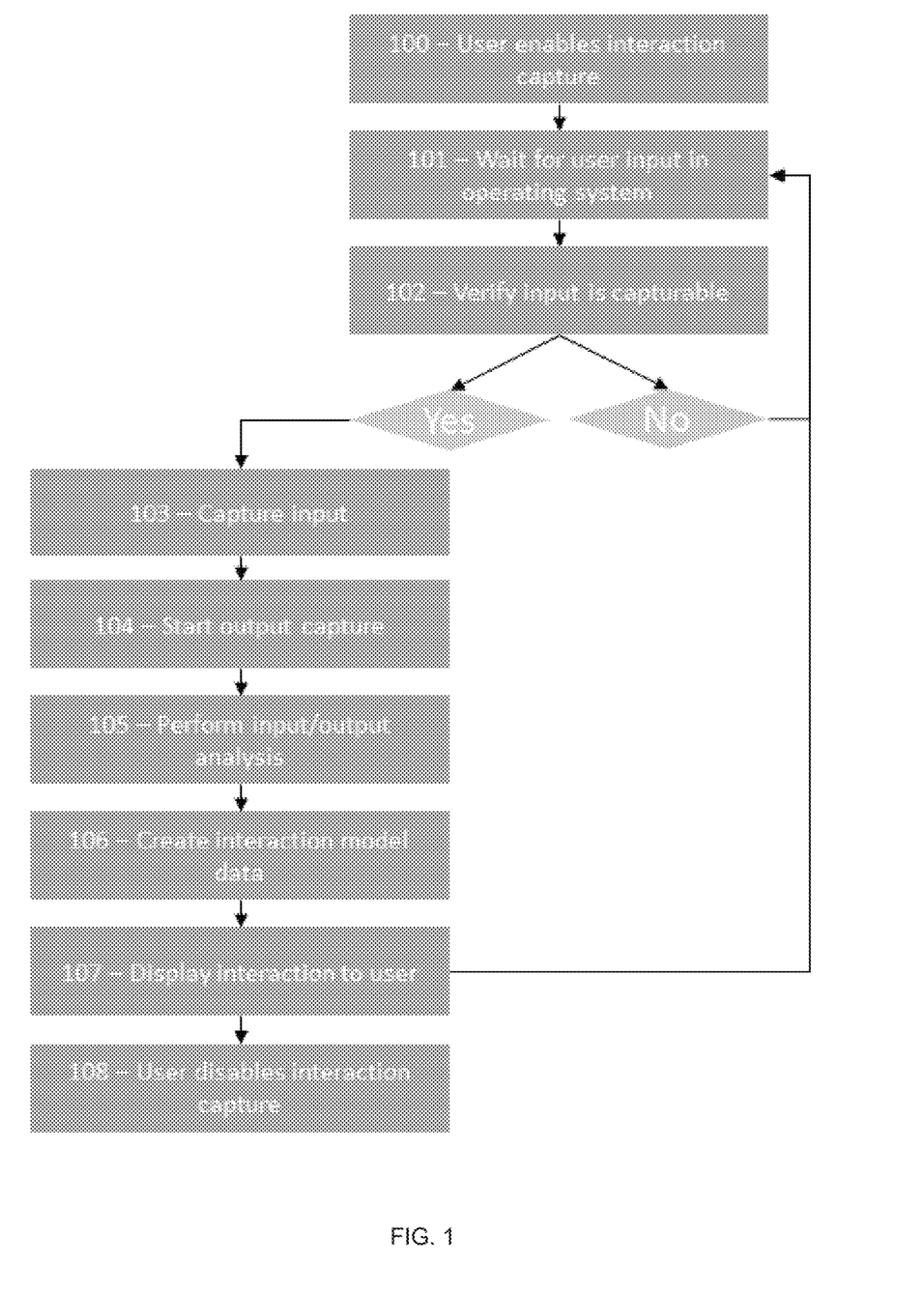
FIG. 1 is a flow diagram of the interaction capture method of an embodiment of the present invention.

FIG. 1 is a flow diagram of the interaction capture method of one or more embodiments of the present invention. This capture method gathers data necessary to create a simulation, while not requiring the user to need to know how to write code. The user need only know how to use the target software/application, an approach much cheaper than creating a custom application to simulate the real one. Such an approach can also capture more information than a screen capture or recording application, while organizing that information into the steps required to simulate the application. This gives the user much more flexibility in defining how the simulation works, while providing a better end user experience than a video or slide presentation. In step 100, the user first initiates the capturing of interactions through a user interface generated by a processing device. Then, in step 101, an embodiment calls into the operating system running on the processing device to be notified of user input. When input is received, in step 102, an embodiment compares the data input to values that are registered for capture along with the current state of the embodiment. For example, the user can configure an embodiment to monitor pressing of only the left mouse button, in which case any other input may be ignored. One or more embodiments of the present invention can also be configured to ignore further input until an ongoing capture process is completed. For example, when capturing a long screen animation, the user may configure an embodiment to ignore any keyboard or mouse input until the record timer has elapsed. If the input is not capturable, then an embodiment will return to the state in step 101 and wait for input again. If the input is capturable, then an embodiment will continue with step 103 and capture the information about the input from the operating system. This can include the relative position of the input device, or the state of any buttons associated with it. Then, an embodiment can also capture the state of configured output devices from the operating system in step 104. This can be the display of a specific computer monitor, or a region of the current display, combined with other configured devices such as audio devices. In step 105, an embodiment can perform analysis on when to stop capturing the interaction based on how the capture was configured. For example, the user can configure an embodiment to only capture a single image, in which case the capture will end once the image is captured. One or more embodiments of the present invention can also be configured to capture a series of images until either a timer is elapsed, or specific input is received, such as a specific keyboard or mouse button is pressed. One or more embodiments of the present invention could also be configured to capture a series of images, audio, or other output until such time that the output data has stopped changing. In one embodiment of this method, it can wait until the difference in pixel data between a captured image and the one before it meets a set threshold, and then end the capture. Once the capture has ended, in step 106, an embodiment combines all the captured data into a structure representing the interaction and saves it to the user's current project (see FIG. 2). In one embodiment, at step 107, the user interface of an embodiment is then updated to show the captured interaction, after which an embodiment returns to the state in step 101. Once the user disables interaction capturing in the user interface, step 108, an embodiment stops the process starting in step 101.

Figure 2:
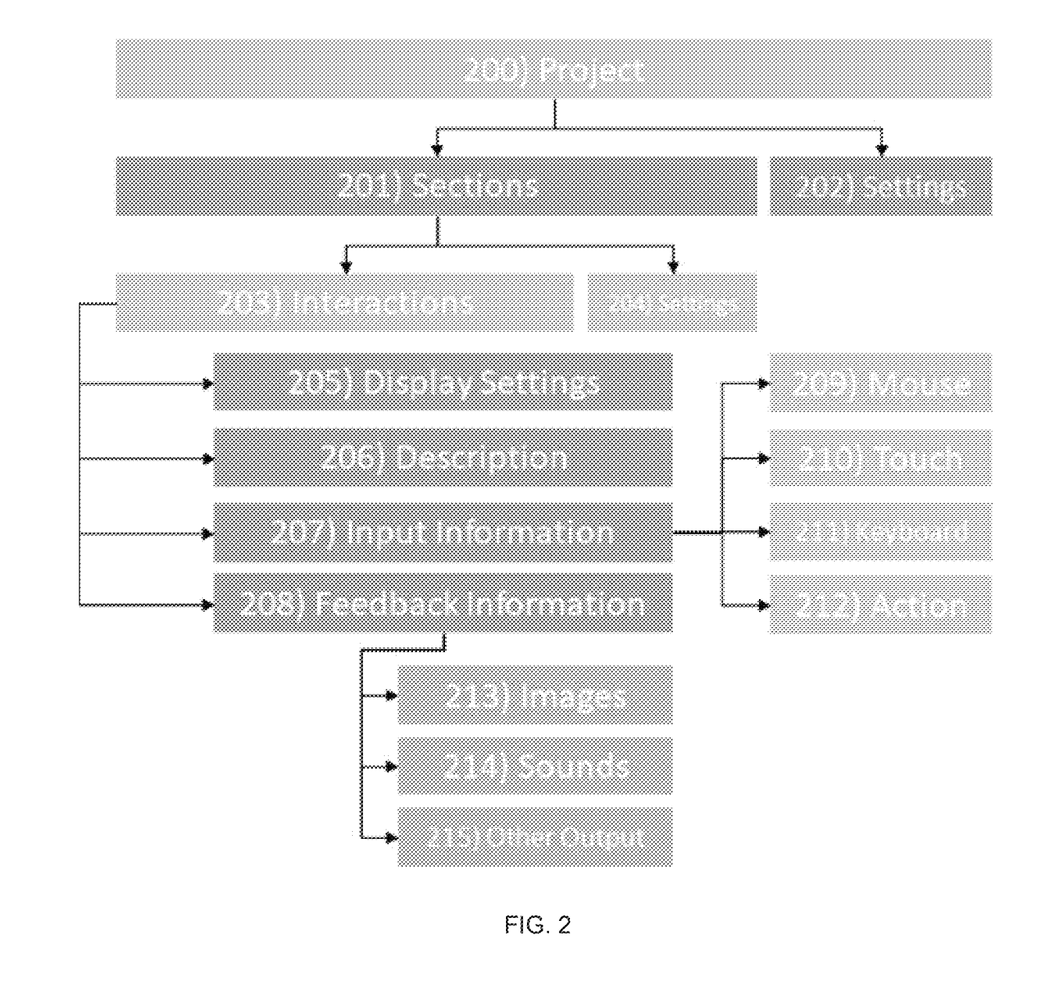
FIG. 2 is a block diagram illustrating the data models for storing interactions in one embodiment of the present invention.

FIG. 2 is a block diagram illustrating the data models for storing interactions in one embodiment of the present invention. Section 200 represents the root level data object, a project, for a specific work item in an embodiment. A project contains a set of settings, in section 202, that contain information about the project, which can include metadata about the project, such as the title, and can also include settings determining render methods to use during export operations. Section 201 shows a list of logical sections, which are used to group the interactions into logical units. Each section within the project also contains settings data, shown in Section 204, that contains metadata about the section, which can include a title, description, or other information. Each section within the project contains a list of interactions associated with it, Section 203, that represent the interaction steps that make up that portion of the simulation. Each interaction contains metadata to be used when creating the final output simulation. Section 205 represents the display settings for the interaction, which can include metadata about the display size, aspect ratio, and any other information needed to construct a simulated display. Section 206 represents description metadata about the interaction, which can be notes or other language to describe what is being shown. Section 207 represents the input information that was captured. Sections 209-211 show example types of input metadata included as part of the interaction. This can include an area of the screen that was clicked, or touched, or what keyboard keys were pressed. Section 212 defines the action taken on the input. During capture this will be tied to the next interaction, since they are captured in sequence. However, this data can be added to or modified once a capture is complete to include different actions. For example, there could be a scenario where a user wants to navigate to the next interaction when one area is clicked, but go back to the previous interaction, or a specific interaction, when a different area is clicked. Section 208 represents the output information for the interaction. This includes an image, or series of images (Section 213) to be shown to the user during the simulation. It can also include other information, such as audio sounds to be played (Section 214) or information for other output devices (Section 215).

Figure 3:
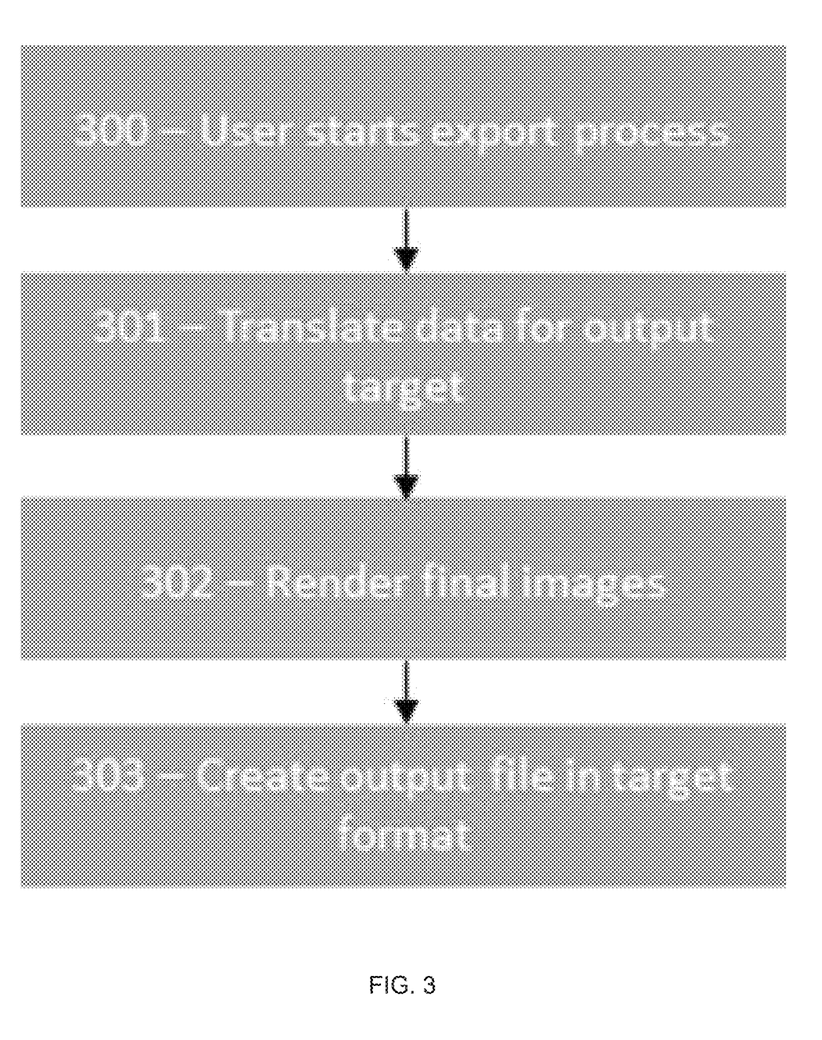
FIG. 3 is a flow diagram of an export process in one embodiment of the present invention.

FIG. 3 is a flow diagram of an export process in one embodiment of the present invention. It starts at Step 300, when the user starts the export process. As part of Step 300, the user can select which type of output they want to export to. In Step 301, an embodiment translates the data of the current project into an appropriate set of data for the target export type. For example, if the user selects a Microsoft PowerPoint file, then the interactions will be translated into a conceptual model of PowerPoint sections, slides, images, and shapes. However, if the user selects a Web Application as the output, the project data will be transformed into the data structures that such output requires, such as JSON files. Since the available resolution and aspect ratio of the target output might not match that of the visuals that were originally captured, the invention continues with Step 302, to render any images to the desired resolution, and can include compositing of captured images with additional graphics when configured to do so. These additional graphics can include watermarks, or other images or vector graphics. Once the images are ready, the export process moves to Step 303 and writes the final output files to a location selected by the user. The file can include a PPTX file, in the case of Microsoft PowerPoint, a set of files comprising a web application, or other file types which the invention supports.

Figure 4:
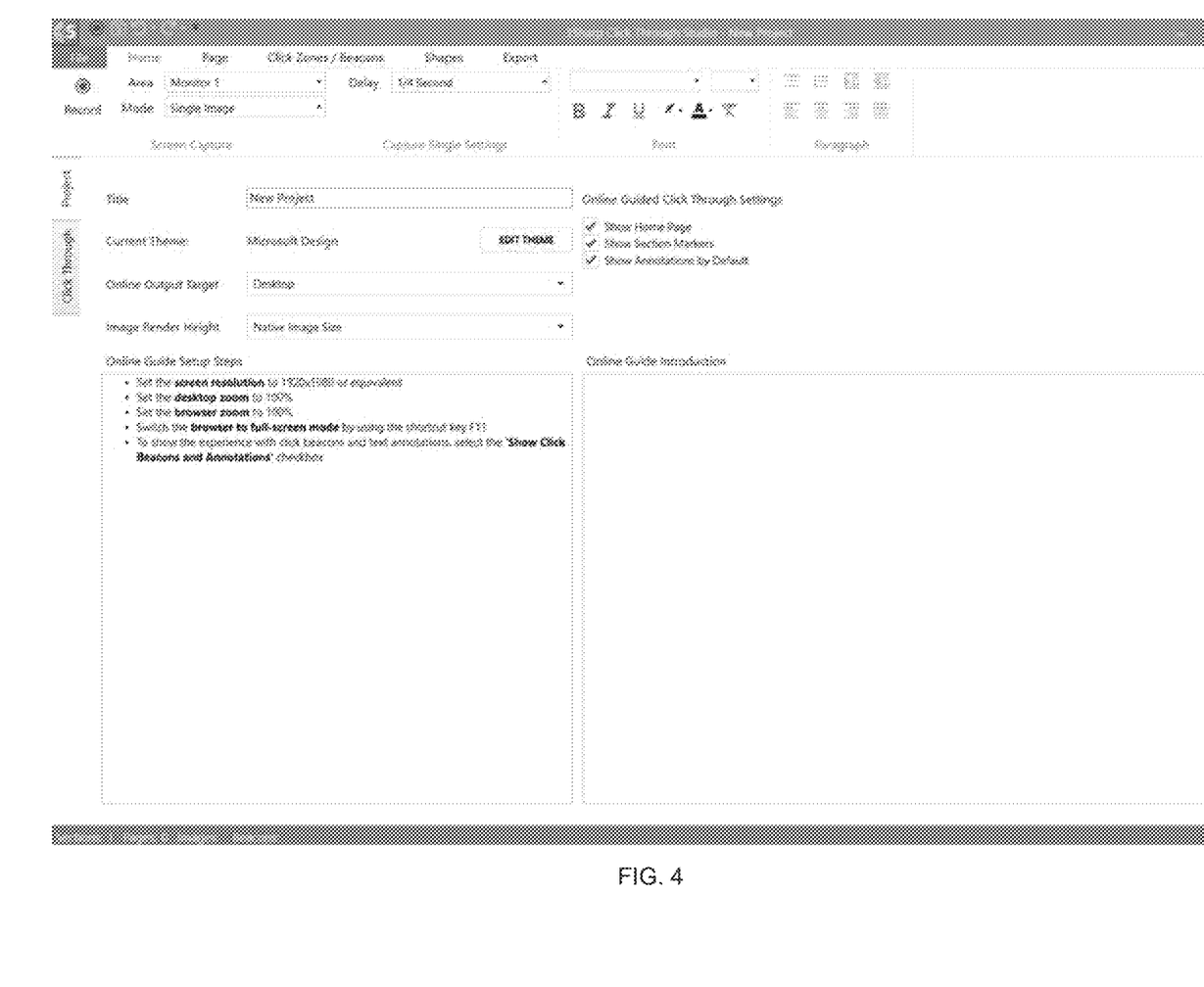
FIG. 4 is a screenshot of the Project Settings user interface in an embodiment.

FIG. 4 is a screenshot of the Project Settings user interface. The Project Settings (Section 202) allows a user to set settings that apply to the project. These settings can define metadata such as the title, description, theme, setup steps, output settings, and other project level settings.

Figure 5:
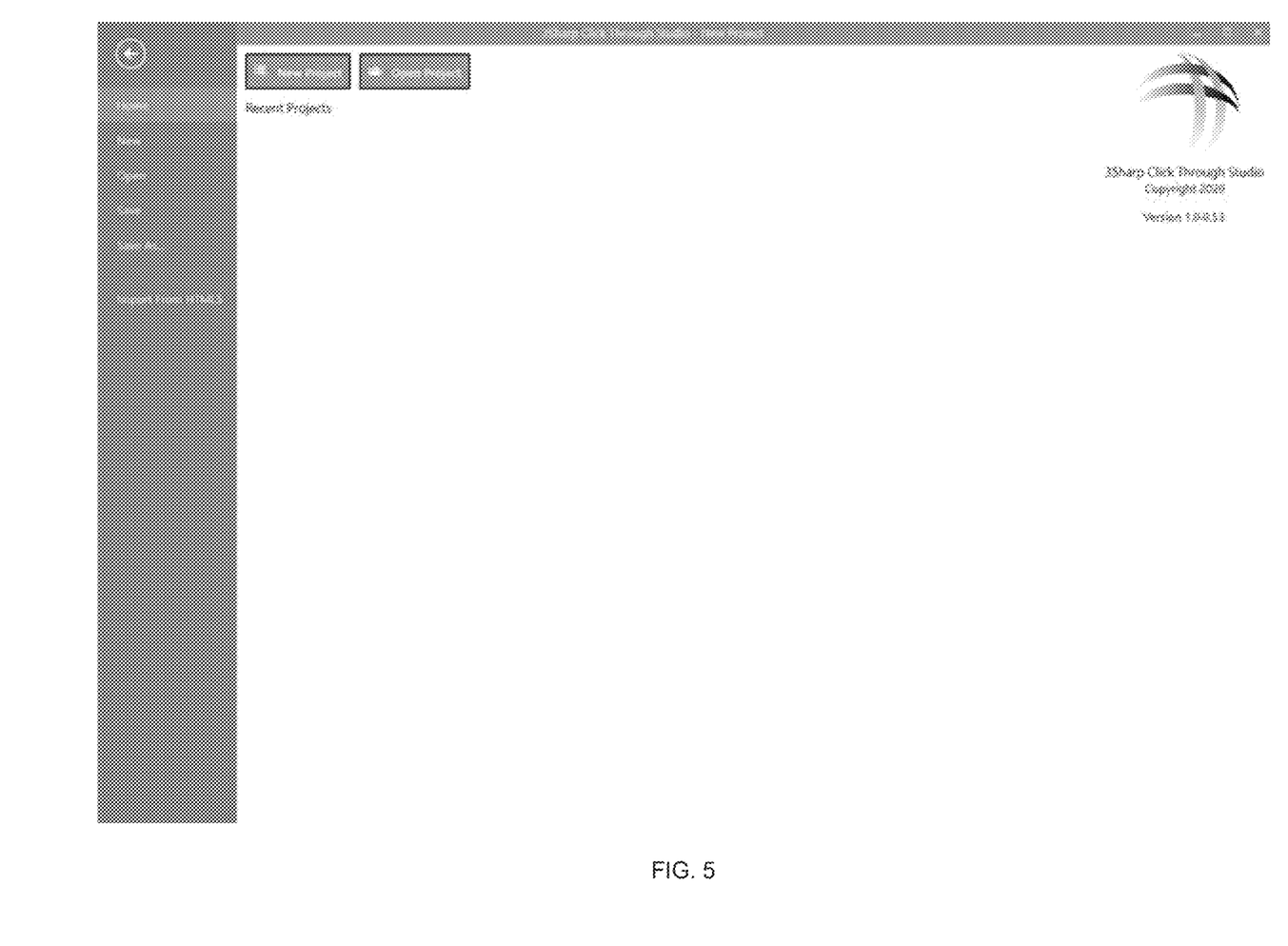
FIG. 5 is a screenshot of the File Menu user interface in an embodiment.

FIG. 5 is a screenshot of the File Menu user interface. The File Menu allows a user to perform file operations such as create a new project, open an existing project, save a project (FIG. 2), as well as other file operations. This interface also displays a recent projects list, as well as the current version of the invention.

Figure 6:
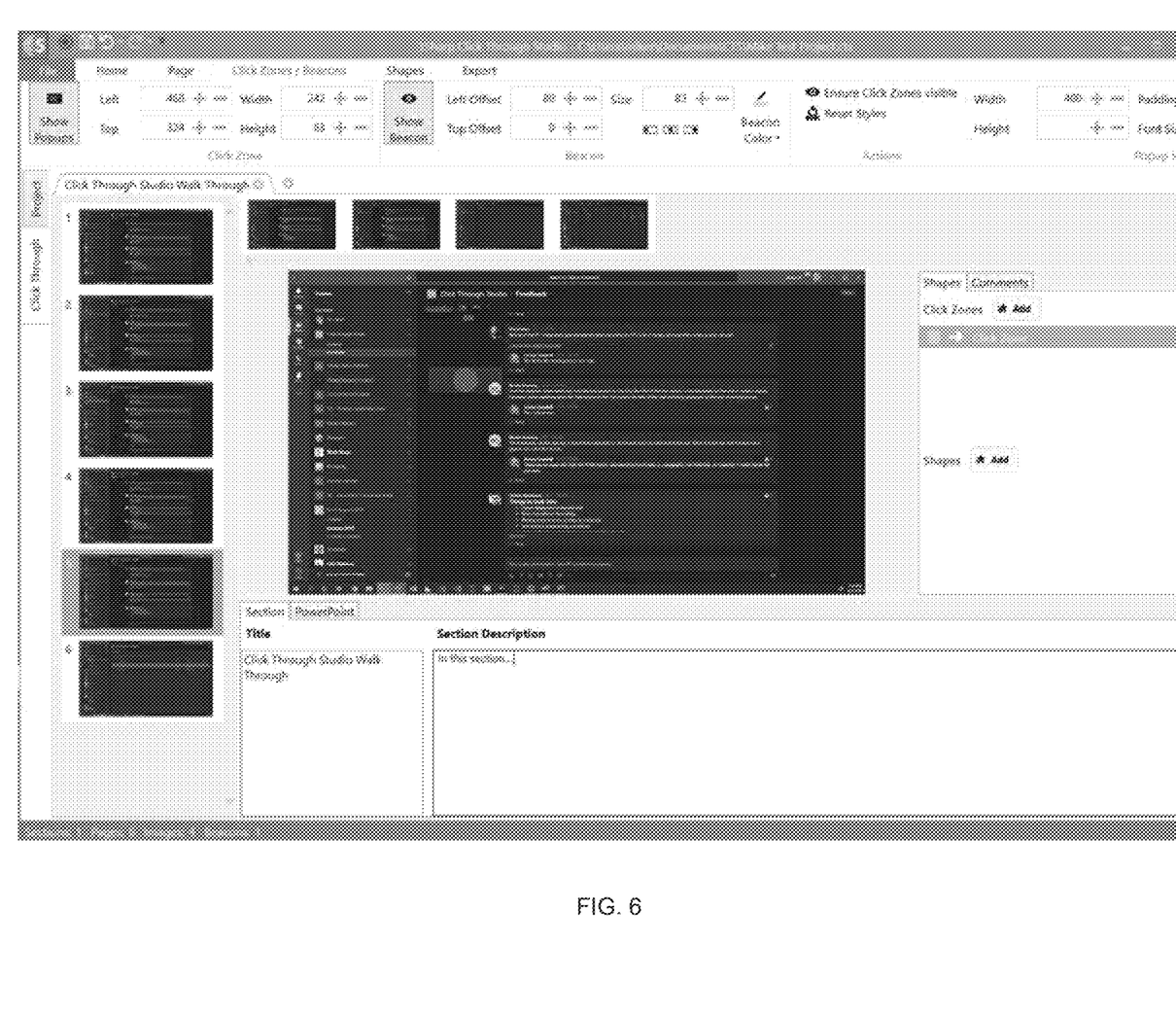
FIG. 6 is a screenshot of the Interactions user interface in an embodiment.

FIG. 6 is a screenshot of the Interactions user interface. The Interaction user interface allows the user to capture (FIG. 1), modify, and manage software interactions. In this interface the user can create and manage multiple sections (Section 201) and section metadata to logically separate sections of simulations.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims.

What is claimed is:

1. A computer-implemented method for creating simulations of computer applications running on a processing device, the method comprising:
monitoring an operating system and applications for user interactions with the processing device;
recording a simulation comprising output of the operating system and applications corresponding to the user interactions with the processing device;
generating a first interface for editing the recorded simulation comprising individual interactions, images, and sounds;
generating a second interface for enabling a user to capture, modify, or manage software interactions, or to add styled content to a step; and
playing back the recorded simulation such that when user input is provided to the processing device, corresponding recorded output is played back to the user along with at least one interactive content layer, wherein at least one action of the processing device is disabled based on a user-configured input.

2. The method of claim 1, wherein the monitored operating system is configured for use with at least one of a desktop or a laptop computer.

3. The method of claim 1, wherein the monitored operating system is configured for use with at least one of a mobile phone or a tablet device.

4. The method of claim 1, wherein the monitored operating system is configured for use with at least one of a virtual reality or an augmented reality device.

5. The method of claim 1, wherein the user interactions are based on a computer-mouse input comprising a mouse-cursor position and mouse-buttons states.

6. The method of claim 1, wherein the user interactions are based on keyboard key-press states.

7. The method of claim 1, wherein the discrete-user interactions are based on a touch-screen state.

8. The method of claim 1, wherein the user interactions are based on a game-controller button state.

9. The method of claim 1, wherein the corresponding output comprises images displayed on a monitor.

10. The method of claim 1, wherein the corresponding output comprises sounds played through a sound device.

11. The method of claim 1, wherein the corresponding output comprises a haptic feedback device.

12. The method of claim 1, wherein the first interface for editing displays a list of steps generated during the recording phase.

13. The method of claim 1, wherein the first interface for editing enables the user to configure the captured user input used to trigger the next step in the simulation.

14. The method of claim 1, wherein the first interface for editing enables the user to edit the captured output.

15. The method of claim 1, wherein the first interface for editing enables the user to insert simulated content that was not captured directly but created using graphic design or user interface prototyping software.

16. The method of claim 1, wherein the styled content comprises text with a specific font, font size, font weight, font style, text decoration, or color.

17. The method of claim 1, wherein the styled content comprises a rectangle with square or rounded corners, with a specific background color or color gradient, with border color, or with border size.

18. The method of claim 1, wherein the styled content comprises a button that allows for actions to take place during a click event.

19. The method of claim 18, wherein the button action jumps to a specific step in the simulation.

20. The method of claim 18, wherein the button action opens a website link.

21. The method of claim 18, wherein the button action sets the state of a variable.

22. The method of claim 1, wherein the styled content is an image.

23. The method of claim 1, wherein the playback of the simulation occurs in a desktop application.

24. The method of claim 1, wherein the playback of the simulation occurs in a mobile phone or tablet application.

25. The method of claim 1, wherein the playback of the simulation occurs in a virtual reality or augmented reality application.

26. The method of claim 1, wherein the playback of the simulation occurs in a web browser as a standalone web application.

27. The method of claim 1, wherein the playback of the simulation is initiated directly by the target user.

28. The method of claim 1, wherein the playback of the simulation is initiated by a user presenting to an audience.

29. The method of claim 1, wherein the playback of the simulation is embedded into a web page.

30. The method of claim 1, wherein the corresponding recorded output represents output directly recorded from the running operating system or application.

31. The method of claim 1, wherein the corresponding recorded output is content that was added during the editing phase by the user and was created using graphic design or user interface prototyping software.

* * * * *